United States Patent [19]

Fritz

[11] Patent Number: 4,867,615

[45] Date of Patent: Sep. 19, 1989

[54] HOPPER CAR DISCHARGE GATE

[76] Inventor: William E. Fritz, 573 Clarissa Ct., Naperville, Ill. 60540

[21] Appl. No.: 221,368

[22] Filed: Jul. 19, 1988

[51] Int. Cl.⁴ ............................................. B65G 53/46
[52] U.S. Cl. .................................... 406/128; 406/131; 406/145
[58] Field of Search ............... 406/128, 129, 131, 145; 222/554, 548

[56] References Cited

U.S. PATENT DOCUMENTS

| 3,797,891 | 3/1974 | Fritz | 406/145 |
| 4,345,859 | 8/1982 | Robertson | 406/128 |
| 4,397,591 | 8/1983 | Carney, Jr. et al. | 406/131 |
| 4,500,230 | 2/1985 | Bateson | 406/145 |

Primary Examiner—Joseph F. Peters, Jr.
Assistant Examiner—Anne Sartelle
Attorney, Agent, or Firm—Kinzer, Plyer, Dorn, McEachran & Jambor

[57] ABSTRACT

This invention relates to a discharge trough for use in combination with a discharge gate of a railroad hopper car. The discharge gate has slanted side walls terminating in spaced, longitudinally extending lips which define a longitudinal discharge opening. The longitudinal trough has a somewhat rounded or circular cross section and merges with the lips of the slanted side walls to define the discharge opening. The slanted side walls are generally flat in the area adjacent the lips, with the lips having a rounded contour merging into the somewhat rounded inner wall of the trough. There is a rod-like discharge valve positioned within the trough adjacent and slightly below the lips to control the flow of material through the discharge opening.

1 Claim, 1 Drawing Sheet

HOPPER CAR DISCHARGE GATE

SUMMARY OF THE INVENTION

The present invention relates to railroad hopper cars and in particular to the discharge gate and more specifically to a discharge trough which is a part of the discharge gate.

A primary purpose of the invention is a discharge trough which has a smooth, unobstructed and continuous contour to prevent either the material being discharged or dirt or other contaminants from becoming caught in crevices or the like in the discharge trough.

Another purpose is a discharge trough in combination with a discharge gate and discharge valve, with the valve being so positioned that no material can be caught between the valve and the discharge gate and/or trough during unloading.

Another purpose is a discharge trough for the use described which is formed and constructed and which cooperates with the discharge valve so that there is no likelihood of any material being discharged being caught within the discharge structure or any dirt or other contaminants remaining in the discharge trough or gate after cleaning.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to a discharge gate for use on railroad hopper cars and more particularly to the discharge trough and the manner in which the trough is secured to the discharge gate. Reference is made to U.S. Pat. No. 4,345,859 which shows many of the details of the gate valve used in combination with the trough and the discharge gate. The disclosure of the '859 patent is herein incorporated by reference.

Figure 1:
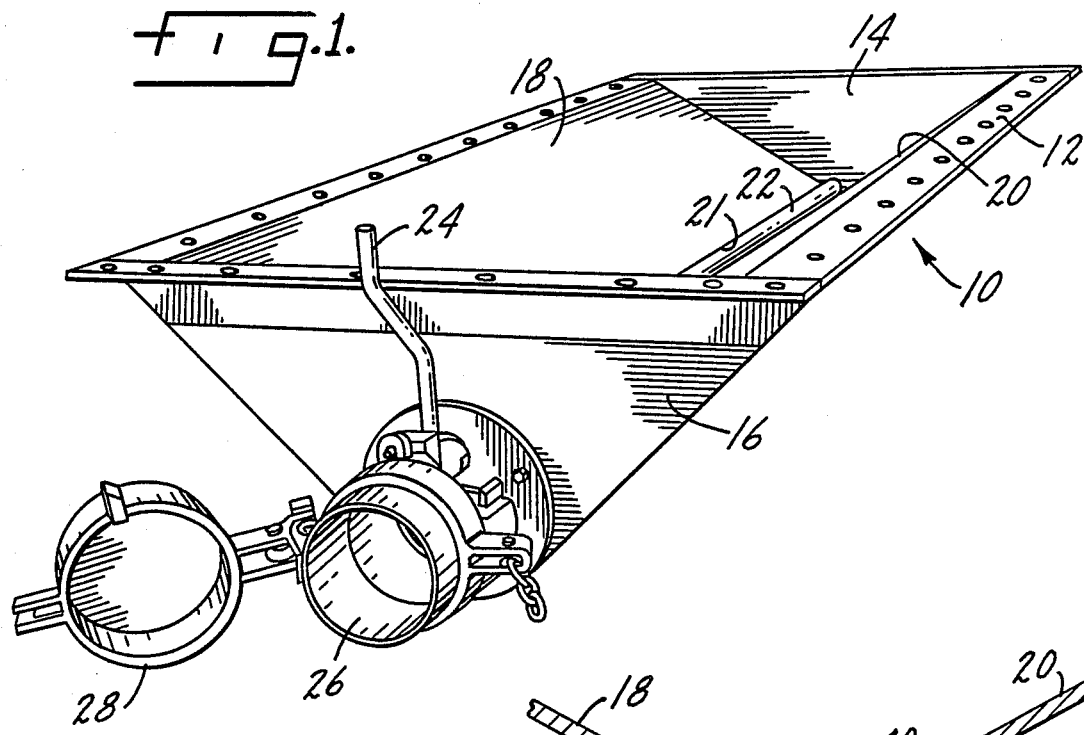
FIG. 1 is a diagrammatic perspective of a discharge gate for use on railroad hopper cars.

In FIG. 1, a discharge gate is indicated generally at 10 and has a peripherally-extending flange 12 which will conventionally be bolted or otherwise secured to the underside of the hopper car body. The gate 10 includes end sheets 14 and 16 and slope sheets or slanted side walls 18 and 20. The gate is defined by the end sheets and the slope sheets which terminate in facing lips forming the opening 21 into the discharge trough which is mounted beneath the opening.

The hopper discharge valve is in the form of a rod 22 which is described in detail in the above-mentioned '859 patent. The rod has three axially-extending grooves, one extending substantially the full length of the rod used when there is a discharge from both sides of the valve 22 into the trough. The other two grooves each extend approximately one-half of the length of rod 22 and cooperate with the full length groove so that the valve provides for discharge from both sides or from one side or the other of the gate into the trough. A handle 24 is mounted exteriorly of the gate and is used to turn rod 22 so as to control the flow of material from the gate into the discharge trough. There will be discharge openings at each end of the gate in the end sheets, one such opening being indicated at 26. These openings are covered by caps 28 and when the hopper car is to be discharged, the operator will attach a vacuum hose to draw material from the hopper car through the gate and through the discharge trough.

Figure 2:
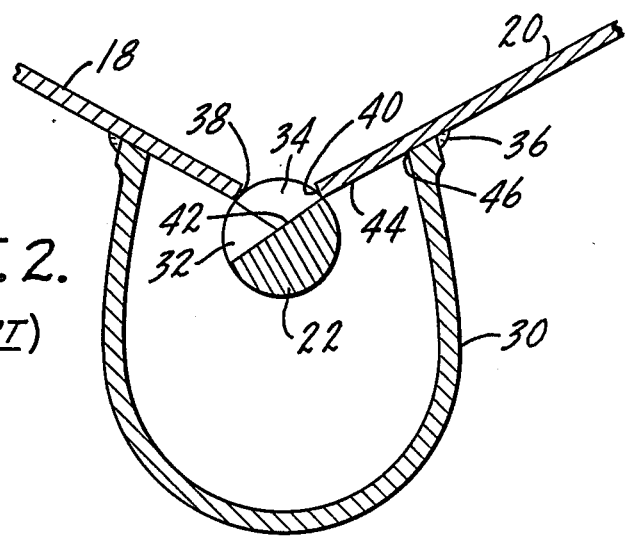
FIG. 2 is a cross section through the discharge trough portion of the gate, illustrating the prior art.

FIG. 2 illustrates the prior art discharge trough which is indicated at 30. Rod 22 is shown in a position in which discharge groove 32, which runs the full length of the rod, cooperates with a discharge groove 34, extending approximately one-half the length of the rod, to discharge material from the gate into trough 30. The other half length groove, not shown, provides for a discharge from the left side of the valve into the trough. This is only one of four possible positions of valve 22. Trough 30 is welded, as at 36, to the bottom side of the slope sheets of the gate. Slope sheets 18 and 20 terminate in lips 38 and 40 which are generally at right angles to the plane or surface of the slope sheets. Note that rod 22, when in the position shown, has groove surface 42 directly adjacent the underside 44 of slope sheet 20.

The granular chemical material normally carried in covered hopper cars may be of many different types. Also, the cars are conventionally used for grain during certain seasons of the year. It is important, after each use of the car, that it be completely cleaned and that no particles remain in the car after it has been cleaned, as the next user of the car may fill it with a material which is totally incompatible with what had been carried on the previous trip. The cars must be clean and contaminant-free when they are loaded with any type of material.

When trough 30 is welded to the slope sheets by longitudinally-extending welds 36, it frequently occurs that a cavity or crevice is formed in the area 46 caused by a pulling away of the trough from the bottom of the slope sheet. These cavities remain after welding and will often gather dirt, dust and some of the granular material which is being carried by the hopper car. Thus, when the car is cleaned, there is a residue of the previously-carried product and this is unacceptable to the new car user. Often these cavities are not noticed and the user believes the car to be clean and free of contamination.

A further problem with the prior art trough of FIG. 2 is that when the discharge rod 22 is in the position shown, there is alignment between groove surface 42 and the bottom surface 44 of slope sheet 20 to the end that material being discharged from the hopper gets caught or embedded between end surface 40 of the slope sheet and one of the discharge grooves. Again, these products will not be finished during the cleaning process with resulting contamination.

Further, because the ends 38 and 40 of the slope sheets 18 and 20 are sharp and are at 90½ to the surfaces of the plates, it is possible for pellets or granules which are being carried by the car to be caught between the edge of the plate and the rod in such a way as to impede or make it difficult to open and close the rod which functions as the discharge valve.

Figure 3:
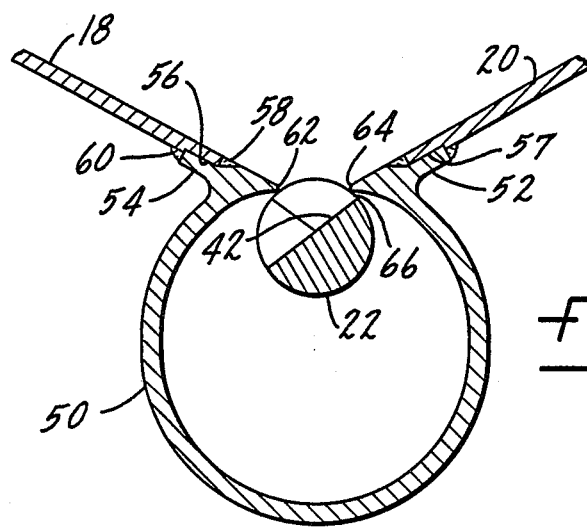
FIG. 3 is a cross section, similar to FIG. 2, but showing the combination discharge gate and trough of the present invention.

FIG. 3 illustrates the discharge trough of the present invention. Trough 50 has a somewhat circular or generally round cross section. The trough has flanges 52 and 54 which extend into groove 56 and 57 in the bottom of the slope sheets. There are two welds which hold each side of the trough to the slope sheets. The upper weld 58 goes into a small recess between the end surface of the slope sheet and the flange of the trough. After this weld is completed, it is ground flat so that the top surface of the slope sheet is smooth and flat. The other weld 60 is between the end of flanges 52 and 54 and in the bottom surface of the slope sheets. These welds have no effect on the interior configuration of the trough. Note that the inside of trough 50 is smooth, circular and without any cavity or obstruction.

Further, the lips of the combined slope sheets and troughs, indicated at 62 and 64, have a smoothed and rounded contour and come generally to a blunt nose, rather than to the square face, as indicated at 38 and 40 in FIG. 2.

Also, the surface 42 of discharge valve 22 is not in alignment with the lower surface of the slope sheet, as indicated in FIG. 2, but is spaced beneath the top surface of the slope sheet, providing a small gap 66. This gap is of sufficient size to insure that no material can be caught between any groove in the valve and the slope sheet.

The construction of FIG. 3 eliminates the problem of small cavities caused by welding, which cavities hold contaminants and granules from one load to another. Further, the position of valve 22 relative to the terminating lips of the slope sheets insures that no product will be caught between the slope sheets and the valve rod and thus there is no possibility that product of one type will remain after the car has been cleaned.

It should be understood that the position of rod 22, in which product is being discharged from one side, is only one of three possible discharge positions, as described in more detail in the above-mentioned U.S. Pat. No. 4,345,859.

Whereas the preferred form of the invention has been shown and described herein, it should be realized that there may be many modifications, substitutions and alterations thereto.

The embodiments of the invention in which an exclusive property or privilege is claimed are defined as follows:

1. A discharge trough for use in combination with a discharge gate of a railroad hopper car, the discharge gate having slanted side walls terminating in spaced longitudinally extending lips which define a longitudinal discharge opening, said trough extending the length of said discharge opening and having a somewhat rounded cross section, the exterior of said trough having, on each side thereof, a pair of longitudinally extending flanges, each slanted side wall having a recess along its longitudinally extending lip, formed and adapted to received a trough flange, a weld between the end of each slanted wall lip and said trough on the inside of each slanted wall, said welds being machined flat, without adjacent openings or crevices, to form generally smooth and flat walls adjacent the discharge lips, with the lips having a rounded contour, gradually merging into the somewhat rounded inner wall of the trough, the inside of the trough being smooth and continuous and having no gaps or crevices for the accumulation of material, a second weld between the end of each trough flange and the exterior of each slanted side wall, on the exterior of both said trough and side walls, whereby said trough is attached to each slanted side wall by a pair of longitudinally extending welds, and a rod-like discharge valve positioned within said trough adjacent and below said lips to control the flow of material through said discharge opening, said rod-like discharge valve having axially extending recesses which cooperate with the discharge opening to control the flow of material, with the bottom of said recesses, in all open valve positions, being spaced below the termination of said rounded lips an amount sufficient to insure that no material is caught between said lips and the discharge valve.

* * * * *